INVENTOR.
FOSTER E. WELD
BY
Meyer, Tilberry & Body
ATTORNEYS

INVENTOR.
FOSTER E. WELD

United States Patent Office 3,566,399
Patented Feb. 23, 1971

3,566,399
CONTROL STATION MONITORING SYSTEM FOR REMOTE STATIONS
Foster E. Weld, Newton Highlands, Mass., assignor, by mesne assignments, to Gulf + Western Systems Company, New York, N.Y., a corporation of Delaware
Filed Feb. 27, 1968, Ser. No. 708,618
Int. Cl. G08b 29/00
U.S. Cl. 340—409                       20 Claims

ABSTRACT OF THE DISCLOSURE

There is provided a monitoring system for sensing conditions at a plurality of remote stations that is comprised of a plurality of remote station energizable monitoring circuits, each including an associated actuatable means that generates an environmental signal representative of a particular condition occurring at the remote station when actuated during a time period that the associated monitoring circuit is energized. A like plurality of sensing circuits, each associated with one of the monitoring circuits and including condition indicating means, have environmental circuits responsive to the environmental signal from the associated monitoring circuit to energize the condition indicating means. A sequencer circuit sequentially energizes each of the monitoring circuits for a given period of time so that during the given period of time, the then energized monitoring circuit is conditioned to transmit the environmental signal in the event that its actuatable means becomes actuated.

This invention pertains to the art of electrical communications and, more particularly, to automatically selected remote plural devices that are responsive to environmental conditions existing at remote stations.

The present invention is particularly adapted for a control station monitoring system for continually sequentially sensing existing conditions at remote stations and it will be discussed with particular reference thereto; however, the invention has somewhat broader applications and it may be used wherever sequential sensing of remote station environmental conditions is desired.

Generally, control station systems are utilized to monitor the condition of a device or environment at a remotely located station and provide visual and/or audible indications in accordance therewith at a centrally located station. Also, such systems are additionally utilized to provide an indication of a trouble condition, such as an open circuit, of the control system itself. An operator at the control station will take note of the visual and/or audible indications to initiate corrective action if such is desired.

The control station devices in the past have used conventional relay or electromechanical arrangements for multi-station condition responsive alarm systems. The recent developments in control station systems have been directed to electronic or static type devices. Prior art control systems using sequencing or scanning systems have been confined to complicated electromechanical systems or to electronic systems using a train of pulses to interrogate a series system of remote stations. However, the above systems do not provide an electronic monitoring system that is not complicated and costly, and one that causes individual indications of environmental, or trouble conditions as each remote location is continually sequentially interrogated as to the condition existing at such remote location.

The present invention is directed to a simplified and inexpensive monitoring system for remote locations which provides individual indications to an operator at a control station as to both an actuated or alarm condition of a monitored device or environment at each remote location, and a trouble condition of the control system itself, as each remote location is individually scanned sequentially, thereby overcoming the noted disadvantages, and others, of previous control systems. It is contemplated that, among the conditions and environments, the present invention sense, and indicate, alarm conditions, thermostatic conditions, manually operative conditions, test conditions, remote station servicing conditions, and system trouble conditions, but not specifically restricted thereto.

In accordance with the present invention there is provided a monitoring system for a plurality of remote stations comprising a plurality of remote station energizable means each including an associated actuatable means for generating an environmental signal representative of a particular condition occurring at the remote station when actuated during a time period that its associated monitoring circuit is energized, a like plurality of sensing circuits each associated with one of the monitoring circuits and including condition indicating means and environmental circuit means responsive to the environmental signal from its associated monitoring circuit to energize the condition indicating means, and a sequencer circuit sequentially energizing each of the monitoring circuits for a given period of time so that during the given period of time the then energized monitoring circuit is conditioned to transmit an environmental signal in the event its actuatable means becomes actuated.

The principal object of the present invention is to provide a monitoring system which sequentially tests the environmental conditions existing at a plurality of remote stations and whether a trouble condition exists in the system or at any remote station.

Another object of the present invention is to provide a monitoring system which has the capability of presenting indications to an operator of both environmental conditions at remote stations and trouble conditions of the monitoring system itself.

Another object of the present invention is to provide a monitoring system having a supervisory current sequentially flowing through each remote station, the increase in amplitude of which is representative of an environmental or alarm condition at such remote station, and the decrease or loss in amplitude of which is representative of a trouble condition of the monitoring system itself or of the individual station.

Another object of the present invention is to provide a monitoring system utilizing static switching circuits, such as diodes and transistors, whereby current requirements and, hence, power requirements are maintained low for economically efficient operation.

Another object of the present invention is to provide a monitoring system which utilizes an electronic ring counter or commutator operating in synchronism with a remote station counter or scanner, causing individual indications of environmental or alarm and trouble conditions existing at any time the system is operating.

A still further object of the present invention is to provide a monitoring system causing trouble indications for trouble conditions existing at individual remote stations, loss of power in the connecting circuitry between remote stations, or loss of power in the connecting circuitry to the remote stations.

These and further objects of the invention will become apparent from the following description of a specific example embodying the invention and the attached claims when taken in conjunction with the accompanying drawings illustrating the described specific example embodying the invention in which:

Figure 4A:
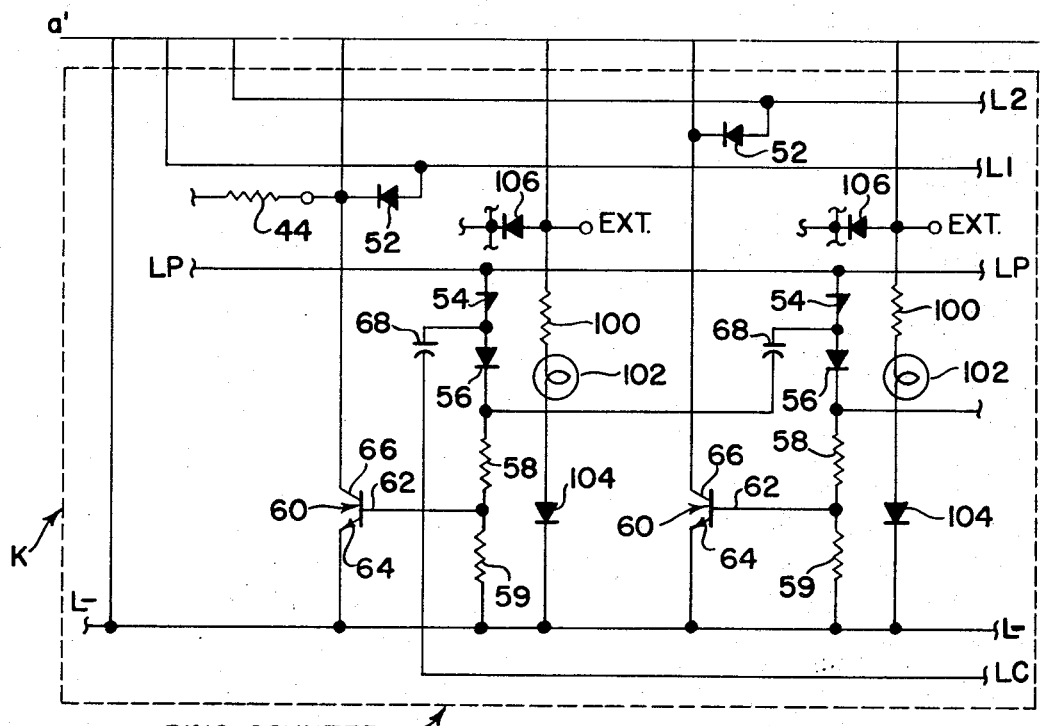
Figure 4:
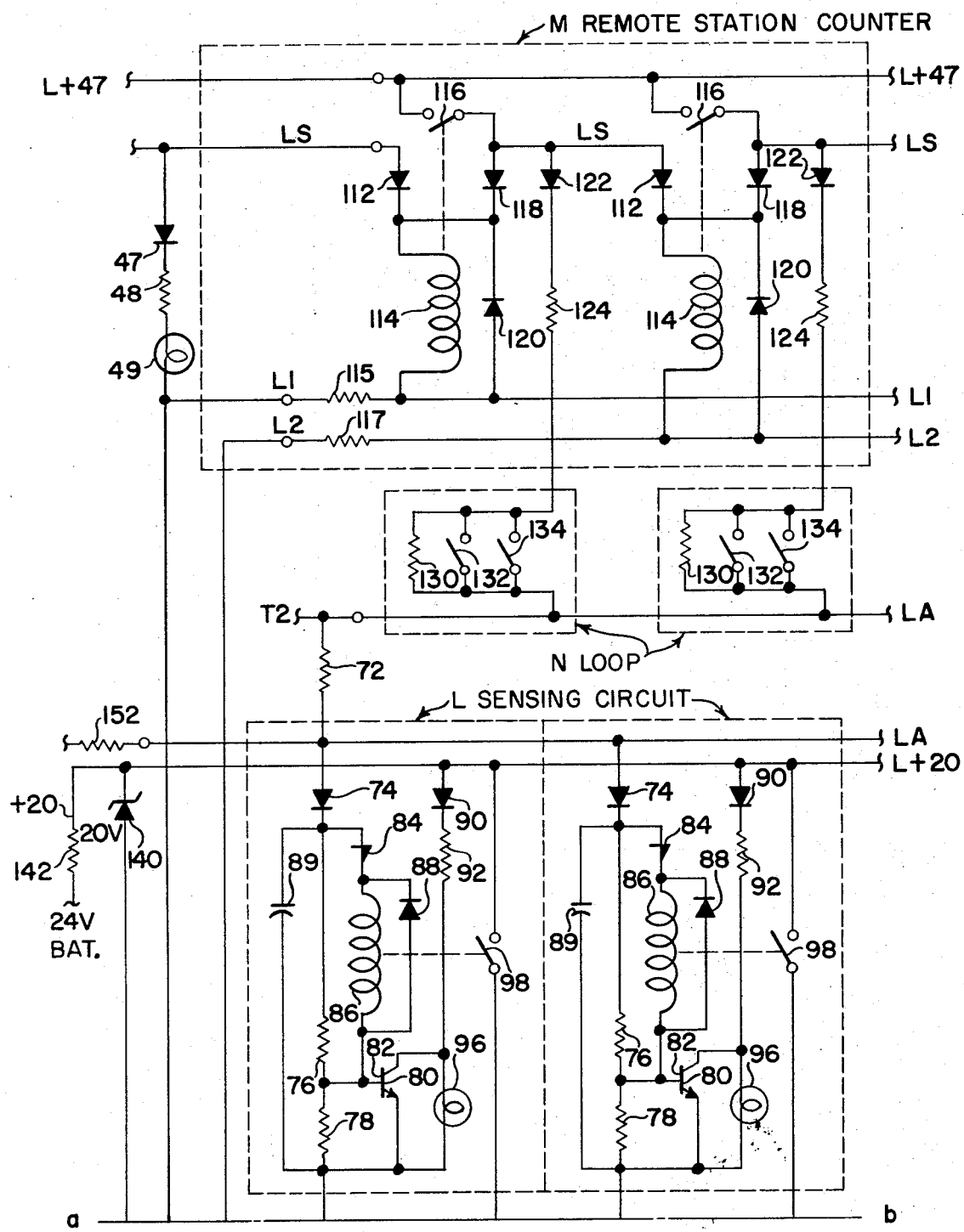
Figure 5:
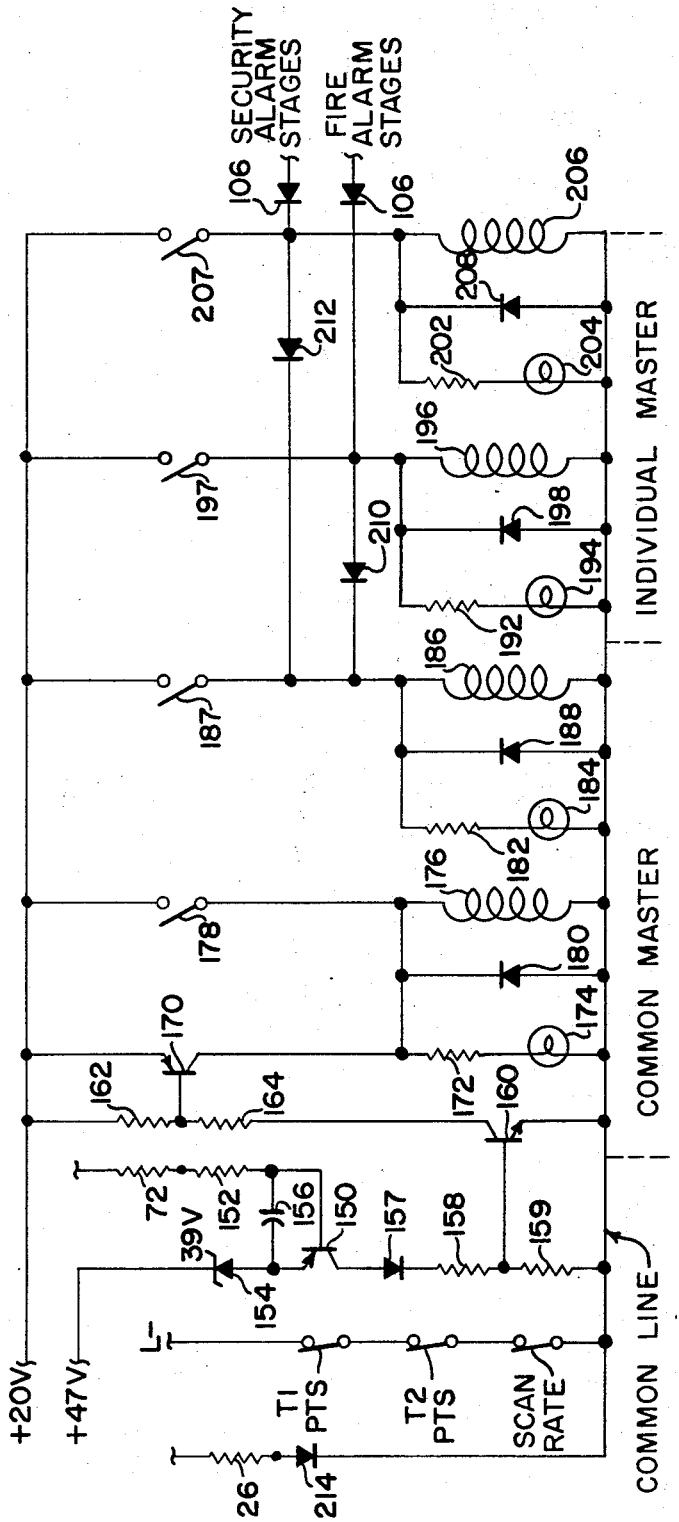

FIGS. 4 and 4A illustrate a circuit showing two stations of a four station monitoring system showing the remote station apparatus, the sensing circuitry and indicators, and the control station counter or commutator of the preferred embodiment of the present invention, FIG. 4A being an extension of FIG. 4, at line a-b; and, FIG. 5 is illustrative of the circuit for the alternate provision of common master circuit controls for the preferred embodiment of the present invention.

Figure 1:
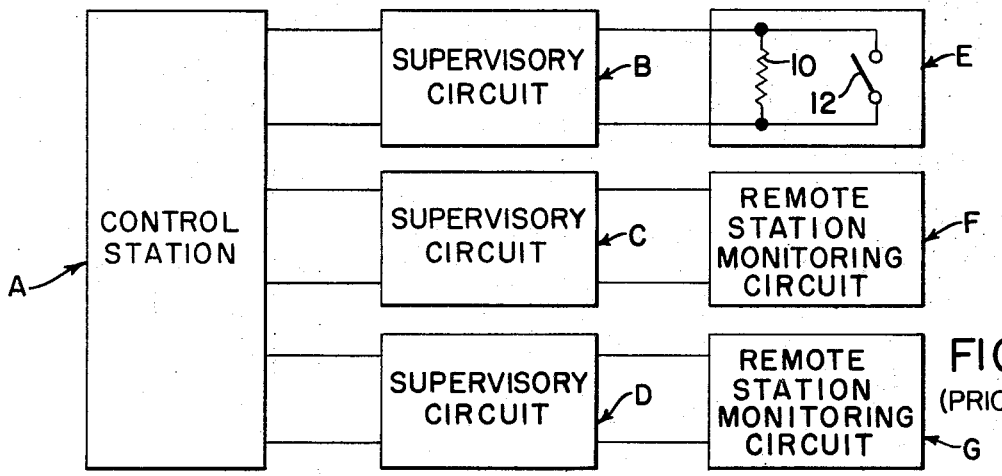
FIG. 1 is a block diagram illustrative of prior multiple remote station monitoring systems.

Referring now to the drawings which are for the purpose of illustrating a preferred embodiment of the invention and not for the purpose of limiting same, FIG. 1 illustrates a previous control system including generally control station equipment A including supervisory circuits B, C and D; and, remote station monitoring circuits E, F and G. The monitoring circuits E, F and G may be located, as desired, at different remote stations within the control system. Each monitoring circuit serves the purpose of monitoring the condition of a device or an environment to develop an actuated signal (i.e. alarm) when a particular condition has occurred. An individual supervisory current is made to flow in each loop, either through an end-of-line resistor 10 or through actuator switch points 12 when closed, with the supervisory circuits B, C and D serving to activate alarm or trouble indicators, for each loop, at the control station. However, no provision is made for a single supervisory current to flow, sequentially, through, all of the loops on a continuous basis, to activate the alarm or trouble sensing circuits within the control station.

Figure 2:
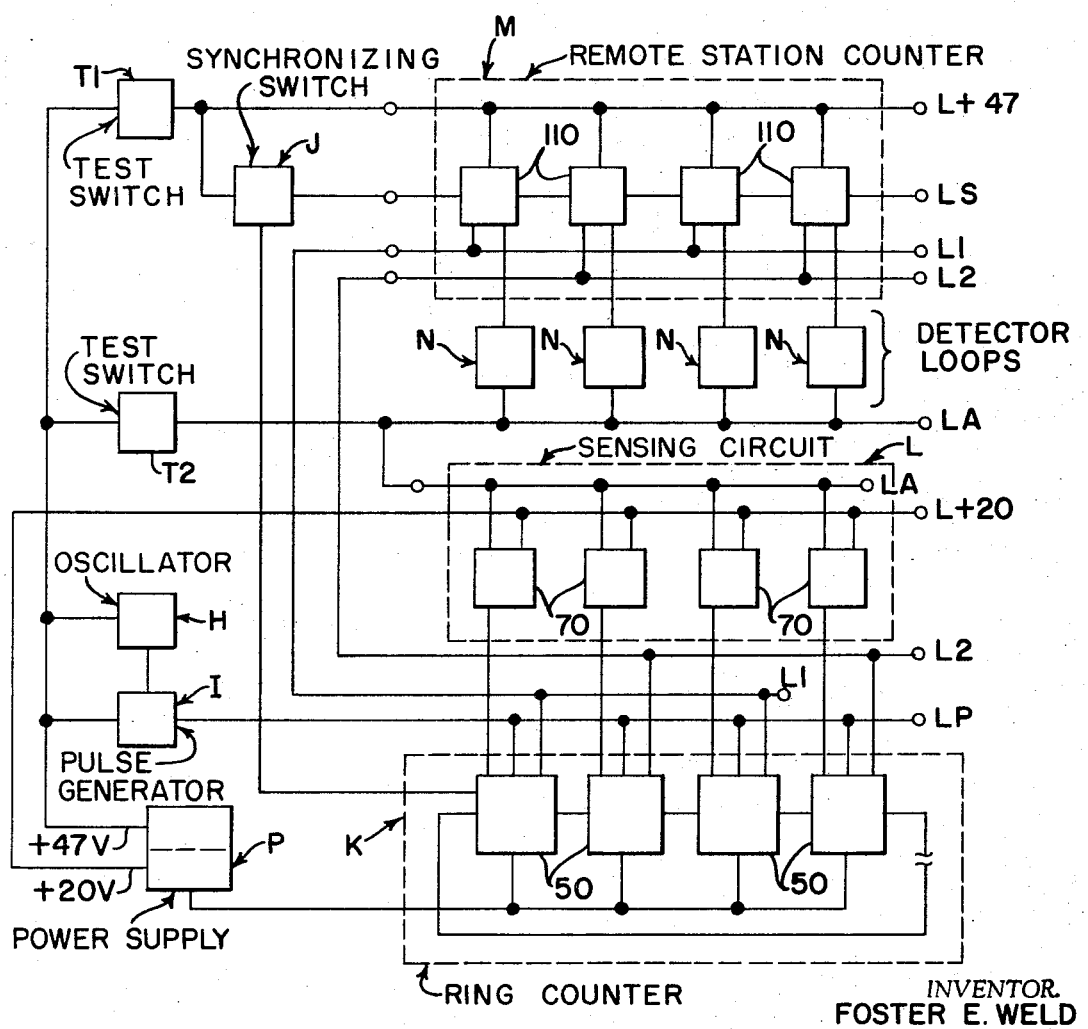
FIG. 2 is a block diagram of the preferred embodiment of the present invention.

The monitoring circuit of FIG. 2 illustrates an advancement in such control systems. FIG. 2 shows a four station system wherein a unitary supervisory current is made to flow throughout the system. FIG. 2 generally includes a sequencer circuit which incorporates a relaxation oscillator H, a pulse generator I, a synchronizing switch circuit J, and a ring counter or electronic commutator K, sensing circuit means L, remote station counter M, remote station detector loops N, power supply P, and test switches T1 and T2.

The relaxation oscillator H serves to drive pulse generator I, which generates drive pulses to step the four stage ring counter K through the individual stages 50. Synchronizing switch circuit J serves to synchronize the individual stages 50 of ring counter K with a four stage remote station counter M, having individual stages 110. A five line system serves to permit the alternate wiring of the remote station counter stages 110 to two of the five lines, which are also alternately wired to the ring counter stages 50.

The remote station detector loops N may be located, as desired, at different remote stations within the monitoring system. Each detector loop N serves the purpose of monitoring the condition of a device or environment at a remote station to develop an environmental or alarm signal when particular conditions exist. The outputs of the detector loops are commoned and connected to sensing circuit means L, having sensing circuits 70, which are located at the control station. The power supply P, at the control station, serves to provide power for operating the monitoring system. Test switches T1 and T2 serve to test the monitoring system lines, and indicators located at the control station.

Figure 3:
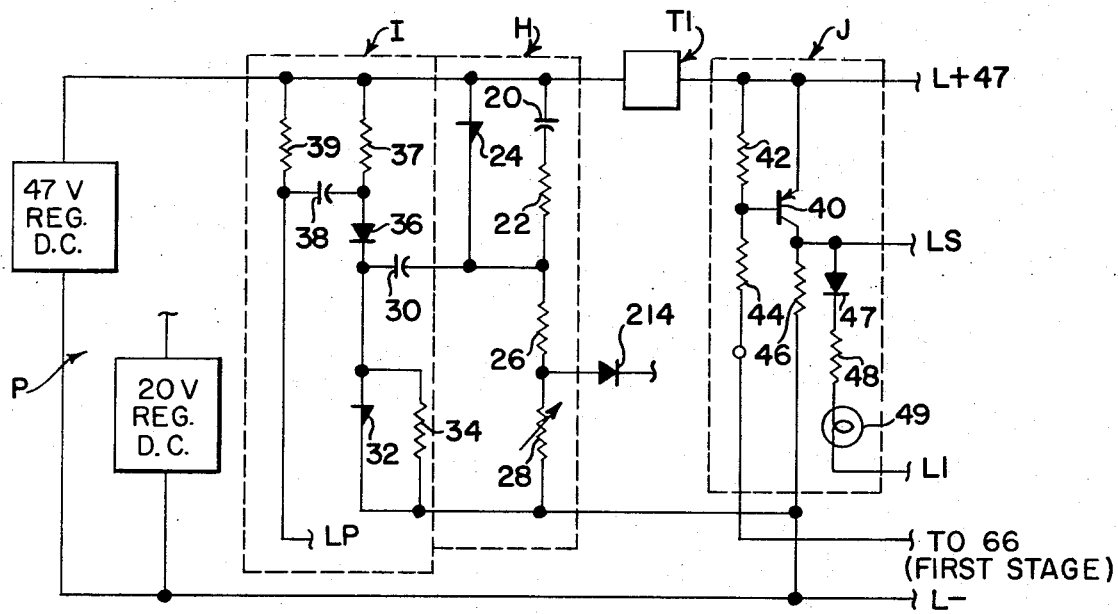
FIG. 3 is a circuit diagram of the voltage source, relaxation oscillator, pulse generator and synchronizing switch of the preferred embodiment of the present invention.

The individual counter stages 50 and 110 are substantially identical to their remaining stages, excepting for the cross wiring of alternate stages to two of the five lines of the system, and, accordingly, the following description with reference to the schematic circuit diagrams, illustrated in FIGS. 3, 4 and 4A, is directed only toward a monitoring system using the first two stages of each of the respective counters.

RELAXATION OSCILLATOR

The relaxation oscillator H portion of the sequencer circuit may take the form, as illustrated in FIG. 3. Capacitor 20 is a charging capacitor, one side of which is wired to the plus side of a 47 v. supply, and the other side wired to a fixed resistor 22. This series capacitor-resistor combination is wired in parallel with a four layer signal diode 24, of a type commonly known as a Shockley switching diode. These four layer diodes are PNPN diodes having a single anode and a single cathode connection. The anode of signal diode 24 is wired to plus 47 v. A fixed resistor 26 and a variable resistor 28 are connected in series between the aforementioned parallel combination and the minus side of the voltage supply. Resistor 28 is used to adjust the frequency of the scanning pulses applied to the ring counter K.

PULSE GENERATOR

The pulse generator I portion of the sequencer circuit serves to generate scanning or stepping pulses when driven by the relaxation oscillator H. A capacitor 30 couples oscillator H to pulse generator I. A four layer signal diode 32, also of the Shockley type, is paralleled by a resistor 34, with one end of the parallel combination and the cathode of diode 32 wired to the minus side of the voltage source, and the other end of the parallel combination wired to one side of capacitor 30 and the cathode of an isolating diode 36. The anode of isolating diode 36 is wired to the plus 447 v. side of the voltage source through a resistor 37, paralleled by a capacitor 38 and a resistor 39 in series. A drive pulse output line LP, to the ring counter K, is taken from the junction of capacitor 38 and resistor 39.

SYNCHRONIZING SWITCH CIRCUIT

The synchronizing switch circuit J portion of the sequencer circuit serves to synchronize, or keep in step, ring counter K and remote station counter M. A PNP transistor 40 serves as a switch with its emitter connected to the plus 47 v. side of the voltage source. Also connected to the plus 47 v. side of the voltage source is one end of a series combination of resistors 42 and 44, with the other end of the series combination connected to the junction between the first stage 50 of ring counter K and the sensing circuit 70 connected to that stage (FIG. 4A). The junction of resistors 42 and 44 is connected to the base of transistor 40, serving as the base biasing network for transistor 40. Connected between the collector of transistor 40 and the minus side of the voltage source is a resistor 46. Connected between the collector of transistor 40 and a line L1 of the system, is an isolating diode 47, a resistor 48 and a synchronizing indicator 49, all in series, with the anode of diode 47 connected to the collector of transistor 40 and the free lead of the indicator 49 connected to line L1. Line L1 is adapted to be also connected to the junction between the first and third (or odd) stages 50 of the ring counter K and the individual sensing circuit 70 connected to that stage, but through the anode of an isolation diode (diode 52, shown on FIG. 4A). The collector of transistor 40 is also connected to the first stage 110 of remote station counter M via a line designated as LS.

RING COUNTER

This ring counter K (or electronic commutator) portion of the sequencer circuit, in the embodiment shown in FIG. 4A, is a four stage counter, but it could be easily expanded to any number of stages. It serves to sequentially select or scan the signals, or lack thereof, from the individual remote station detector loops N. Line L1 is adapted to be wired to the first and third (or odd) stages 50 through isolating diode 52, whereas a line L2 is adapted to be wired to the second and fourth (or even) stages 50, through a like isolating diode 52. FIGS. 4 and 4A illustrate only the first and second stages of the monitoring system, for the reasons outlined earlier.

In FIGS. 4 and 4A, the output line LP of the pulse generator I is wired to the anode of a four layer signal diode 54, also of the Shockley type, serving as a switch. The other terminal of signal diode 54 is wired to the minus side of the voltage source through the anode of an isolating diode 56, a resistor 58 and a resistor 59, all in series. The junction of resistors 58 and 59 is wired to an NPN transistor 60 at its base 62. The emitter 64 of transistor 60 is wired to the minus side of the voltage source, and the collector 66 of first stage transistor 60 is wired to the free end of resistor 44 (FIG. 3), to line L1 through diode 52 and to sensing circuit 70. The collectors 66 of all of the remaining odd stage transistors 60 are wired to L1 through diode 52 and to sensing circuit 70. The collectors of all of the even stage transistors are wired to L2 through diode 52 and also to the associated sensing circuit 70.

A capacitor 68 in each stage serves as a coupler between stages, with one side of capacitor 68 wired to the junction of diode 56 and resistor 58 of the lower stage, and the other side of capacitor 68 wired to the junction of the cathode of four layer signal diode 54 and the anode of isolating diode 56 of the upper (or advancing) stage. The junction of isolating diode 56 and resistor 58 of the last stage 50 of ring counter K is wired back, as shown by the line LC, to capacitor 68 of the first stage 50, to thereby close the ring.

SENSING CIRCUIT MEANS

The sensing circuit means L of FIG. 4 serves to sense the individual conditions existing within the system. A commoned line LA from the remote station detector loops N is wired through a resistor 72 to the anode of an isolating diode 74, of each sense circuit 70. The cathode of each diode 74 is wired through two resistors 76 and 78, in series, to collector 66 of transistor 60 of ring counter K. The junction of resistors 76 and 78 is wired to an NPN transistor 80, at the base 82. The junction of diode 74 and resistor 76 is wired to the anode of a four layer signal diode 84, also of the Shockley type. The other side of four layer signal diode 84 is wired to base 82 of transistor 80 through a relay coil 86 and an isolating diode 88 in parallel, with the anode of diode 88 wired to base 82 of transistor 80. Capacitor 89 is wired in parallel across resistors 76 and 78.

Connected from a plus 20 voltage source to the junction of resistor 78 and collector 66 of transistor 60, is a series circuit of an isolating diode 90, a resistor 92 and a trouble indicator 96, with the cathode of diode 90 connected to resistor 92. The collector of transistor 80 is connected to the junction of resistor 92 and trouble indicator 96, whereas the emitter of transistor 80 is connected to the junction of resistor 78 and collector 66 of transistor 60.

Connected between the plus 20 voltage source and the minus side of the voltage source is a series circuit of normally open relay points 98, a resistor 100, an environmental or alarm indicator 102, and an isolating diode 104, with the cathode of diode 104 connected to the minus side of the voltage source, and the normally open relay points 98 connected to the plus 20 v. line. A diode 106, whose anode is connected to the junction of relay points 98 and resistor 100, is an isolation diode whose function will be explained henceforth. Diode 104 can be eliminated.

REMOTE STATION COUNTER

In FIG. 4, only the first two stages 110 of remote station counter M are shown, for reasons previously outlined. The line LS, as previously shown, originates from the collector of transistor 40 (FIG. 3). Line LS is wired to the anode of an isolating diode 112, whose cathode is wired back to line L1 (for the first stage and all the odd stages 110) through relay coil 114, and a line resistor 115. Note that for the second stage 110 (and all the even stages), the connection from relay coil 114 is through a resistor 117 to line L2.

Normally open relay points 116 are wired from the plus 47 v. line through cathode facing isolating diodes 118 and 120 to the respective ring counter line for that stage. The cathodes of diodes 112 and 118 are also jumpered together. An isolating diode 122 is wired to the remote station detector loop N through a resistor 124, with the anode of diode 122 wired to the junction of N/O relay points 116 and the anode of diode 118. It is to be noted that this junction is also wired (as line LS) to the anode of diode 112 of the next advancing stage 110 of the remote station counter M.

REMOTE STATION DETECTOR LOOP

The remote station detector loop N serves as a monitoring circuit for environmental conditions, or for an alarm condition, for any remote station. Each detector loop N is wired between resistor 124 of remote station counter stage 110 and the common line designated as line LA. The detector loop N, of FIG. 4, is shown in simplified form, with a typical end-of-line 15K resistor 130, and several representative normally open switches 132 and 134, all in parallel. It is to be noted that the normally open switches 132 and 134 are only representative of an alarm switch, or a thermostatic switch, or a manually operative switch, or any equivalent actuated device.

MISCELLANEOUS

The power supply P of FIG. 3 is designed to produce several plus voltages, each with a specific function. The plus 47 v. line serves to power the control system relays and solid state devices, in addition to providing a source for the monitoring currents passing through the remote station detector loop N. The plus 20 v. line, developed from a 24 volt battery supply, resistor 142 and Zener diode 140 (see FIG. 4), serves basically to power the indicators of the sensing circuit 70. Push button test switches T1 and T2 serve to test all indicating lights and the associated control circuitry; T2 for all alarm or environmental indicators and T1 for all trouble indicators.

OPERATION

In operation, the monitoring circuit illustrated in FIG. 2, shown as a four station system, utilizes a unitary supervisory current and a series of drive pulses generated by the combination of relaxation oscillator H and pulse generator I to sequentially step the ring counter K through the individual ring stations in synchronization, under control of synchronizing switch circuit J, with the remote station counter M, to sense the condition or environment existing at any individual remote station detector loop N. The sensing circuit L is designed to differentiate between a trouble (i.e., open circuit) or environmental condition existing in the individual remote station circuits, and to indicate each condition at the control station A (as in FIG. 1). Power, in the form of regulated 47 volts and 20 volts (for the indicators), is supplied to the system by a power supply P. Push button test switch T1 tests the operation of all trouble indicator circuitry, and push button test switch T2 tests all the environmental (i.e., alarm) circuitry.

When power is applied to the relaxation oscillator H, shown in FIG. 2, four layer signal diode 24 is shorted by capacitor 20, and diode 24 remains nonconducting. Four layer signal diode 24 is a Shockley type PNPN diode (as shown on pages 66 and 67 of the General Electric SCR Manual, 3rd edition) having only one anode and one cathode terminal. Switching of these diodes is initiate at the device's specified break-over voltage and current. Once that break-over voltage and current has been reached, the device conducts and operates as a switch, permitting the desired signal to be passed through. Therefore, when capacitor 20 becomes charge to the extent that the voltage across signal diode 24 equals its switching voltage, signal diode 24 will conduct, discharging capacitor 20 so that a positive pulse through the coupling capacitor 30 is impressed upon pulse generator I. Because resistor 26 will not permit sufficient holding current to maintain conductance in signal diode 24, capacitor 20 will recharge and the above cycle will be repeated at a rate determined by the values of capacitor 20, fixed resistors 22 and 26, and variable resistor 28. Fixed resistor 26 is used to limit the scanning rate if variable resistor 28 is adjusted to zero resistance, and, also, to make the adjustment of variable resistor 28 less critical. Resistor 28, as previously explained, is used to adjust the frequency of the scanning pulses applied to the ring counter K.

The pulse generator I is used for driving the ring counter K by means of the line indicated as LP. When the 47 volts are applied to the system, capacitor 38 becomes charged, as this voltage is supplied to the ring counter K through resistor 39. The positive pulses generated through capacitor 30 by relaxation oscillator H, and impressed upon the anode of four layer signal diode 32, are of sufficient magnitude to cause conduction in signal diode 32. Each time signal diode 32 conducts, capacitor 38 discharges through signal diode 32 and momentarily shorts out the 47 volts supplied to all stages of ring counter K, causing the ring counter K to advance one stage for each pulse from the pulse generator I, as will be explained subsequently. Fixed resistors 34 and 37 form a voltage divider across signal diode 32 to limit the voltage across this diode, and isolation diode 36 prevents feedback of the generated pulses from oscillator H.

When the 47 volts are first applied and capacitor 38 becomes charged, voltage will be applied to ring counter K at a rate determined by the timing constant of capacitor 38 and resistor 39. When this first applied voltage reaches the switching voltage level of a four layer switching diode 54 (see FIG. 4A), any one signal diode 54 of ring counter K will conduct, depending upon which signal diode 54 is the most sensitive, reducing its resistance from practically infinity to nearly zero. Thus, it is seen that operation of ring counter K can be commenced in any stage of the ring counter. When any one stage of ring counter K has been triggered into conduction, the voltage drop across resistor 39 decreases, thus lowering the voltage supplied to ring counter K below the switching voltage of any of the remaining signal diodes 54 in ring counter K, insuring that only one stage can be switched on at one time. As previously explained, each time signal diode 32 conducts, capacitor 38 momentarily shorts out the 47 volts supplied to all stages of ring counter K, causing ring counter K to advance one stage from the previously conducting stage, for each pulse generated by pulse generator I. Since the last stage of ring counter K is coupled back to the first stage, operation of ring counter K will be continuous as long as relaxation oscillator H and pulse generator I are operating.

Referring now to FIG. 4A, when any stage signal diode 54 is conducting, capacitor 68 of the next succeeding stage is charged to the voltage appearing across resistors 58 and 59 of the conducting stage, putting a negative voltage on the cathode of the next succeeding stage signal diode 54. This has the effect of conditioning the succeeding to ring counter K, as previously explained, upon the next operation of pulse generator I, the conducting signal diode 54 will cease conduction, but capacitor 68 of the conditioned ring counter stage will retain or store its charge. Restoring the 47 volts to ring counter K by once again charging capacitor 38, places plus 47 v. upon the anodes of signal diodes 54. This applied plus voltage combined with the negative stored voltage of the conditioned capacitor 68, causes conduction in the signal diode 54 of the conditioned stage because the switching level of signal diode 54 of this stage will be reached and conduction will have commenced therein before the voltage applied to the anode of the signal diode 54 of any other stage is high enough to cause switching in such other signal diodes. Once conduction takes place in the conditioned signal diode 54, the voltage drop across resistor 39 decreases again, again lowering the voltage supplied to ring counter K below the switching voltage of any of the remaining nonconducting signal diodes 54, and insuring that only one stage can be switched on at one time. Capacitor 68 of another succeeding stage is now charged, and the cycle repeats, with ring counter K continuously stepping through its various stages under control of pulse generator I.

As previously pointed out, resistors 58 and 59 serve as a voltage divider, and isolation diode 56 prevents the discharge of capacitor 68 of the advanced ring stage when signal diode 54 of the conducting stage ceases to conduct. However, whenever a signal diode 54 is conducting, base 62 of NPN transistor 60 is forward biased, due to the voltage drop across resistors 58 and 59, so as to permit conduction in transistor 60. Transistor 60, when conducting, completes a circuit from sensing circuit 70 of the conducting ring counter stage to the minus side of the line.

Synchronizing circuit J. of FIG. 3, serves to synchronize ring counter K with remote station counter M. PNP transistor 40 is normally biased "off." Whenever ring counter K first stage 50 is caused to conduct, after power is applied to the system, plus 47 volts is impressed across resistor base biasing network, resistors 42 and 44, through the ring counter's first stage transistor 60 to the minus side of the line. This forward biases the base of transistor 40 and causes conduction therein through resistor 46 to the minus side of the line. Once transistor 40 is in conduction, isolation diode 47, resistor 48 and indicator 49, complete an indicating circuit to L1 through isolation diode 52 and first stage transistor 60 to give a visual indication whenever ring counter K first stage 50 is conducting.

Once conduction takes place in transistor 40, referring now to FIGS. 4 and 4A, remote counter M is triggered into operation by connecting plus 47 volts to the line indicated as LS. This applies voltage to relay coil 114 of the first stage of remote counter M, through isolation diode 112, and then to line 1 through resistor 115 (for the odd number stages). L1 is connected to ring counter K first stage transistor 60, and all the other odd stages, through isolation diodes 52. When coil 114 is energized, its normally open relay points 116 are closed, providing a holding circuit for coil 114 through isolation diode 118. A second circuit from plus 47 volts through N/O points 116 to coil 114 of the second stage is "conditioned" but cannot be completed because of being connected to the nonconducting ring counter K stage two, via line L2 and resistor 117. A third circuit through N/O relay points 116 is through isolation diode 122 and resistor 124 to the detector loop N for that stage. Coil 114 of the first stage of remote counter M will remain energized as long as first stage transistor 60 of ring counter K remains conducting. When ring counter K first stage transistor 60 turns off, the circuit to first stage coil 114 will open, but before normally open relay points 116 for this first stage open, the second circuit, to second stage coil 114, will be closed when conduction takes place in transistor 60 of the second stage of ring counter K. This is because the drop out time of coil 114 is over 100 times longer than the pick-up time for this coil. Also, isolation diode 120 limits the surge voltage of coil 114 and thus helps to delay the drop-out of this coil. Thus, ring counter K and remote station counter M are synchronized, or kept in step, whenever the system is in operation.

As shown in FIGS. 4 and 4A, the normal circuit of the system is completed with the closing of N/O relay points 116 completing a circuit through isolation diode 122, resistor 124, the end-of-line resistor 130 in the external detector loop N, line wire LA, resistor 72, to the sensing circuit L of the conducting stage of ring counter K, for the passage of normal monitoring current. In sensing circuit L, this normal monitoring current passes through isolation diode 74, resistor divider network consisting of resistors 76 and 78, and through the conducting transistor 60 of ring counter K to the minus side of the line. The voltage drop across the resistor divider network (resistors 76 and 78) forward biases base 82 of NPN transistor 80, causing conduction therein, from plus 20 volts through isolation diode 90 and resistor 92. Causing transistor 80 to conduct, effectively bypasses trouble indicator 96 and no unusual indication is sensed.

A trouble condition usually indicates that the normal circuit just described has opened, i.e., a break in the lines, and the lack of monitoring current will cause trouble indicator 96 to operate. This occurs because transistor 80 is normally biased "on" when a corresponding transistor 60 of ring counter K is conducting, by the voltage drop across resistor 78 produced by the monitoring current through the lines and remote zone detector loop N. A loss of the monitoring current through resistor 78 will result in transistor 80 not being biased "on," and indicator 96 will be operated by the current from the 20 volt line, to isolation diode 90, resistor 92 and transistor 60 of the conducting stage of ring counter K. Isolation diode 90 prevents feedback from the 47 volts supply to the 20 volts supply when any transistor 60 is not conducting.

For sensing an environmental or alarm condition a third circuit is in operation. By operating either switch 132 or switch 134, end-of-line resistor 130 is shorted out. This effectively removes 15 kilohm resistor 130 from the circuit and thereby increases the current flowing in the circuit involved. With normal monitoring current flowing, four layer signal diode 84 and relay coil 86 in series, and paralleled across resistor 76, will have insufficient current flowing through them to switch diode 84 "on." This is because the switching voltage of signal diode 84 is higher than the voltage drop across resistor 76 caused by the normal supervisory current. When the current is increased (by shorting out end-of-line resistor 130), the increased voltage drop across resistor 76 will exceed the switching voltage of signal diode 84, thereby causing it to conduct, and relay coil 86 will then be energized by the 47 volts applied. When relay coil 86 is energized, its N/O contacts 98 close, completing a circuit from plus 20 volts through resistor 100, environmental or alarm indicator 102 and isolation diode 104, to the minus side of the line. Isolating diode 104 prevents feedback from the 24 volt battery to the 20 volts supply when normally open contacts 98 are opened. The EXT terminal is provided to be used to control an external circuit, such as an extension alarm pilot light or a relay for controlling a signal recorder.

OPTIONAL FEATURES

FIG. 5 illustrates the circuit for the alternate provision of Common Master circuit controls for the preferred embodiment of the invention. In addition to the individual trouble, and environmental or alarm indicators, a pair of Master indicators may be provided. The Master trouble indicators will be lighted in response to a break in any remote station detector loop end or in any line wire, regardless of location, or in the event of a loss of power to the line circuit. The Master environmental or alarm indicators will be lighted in response to an environmental condition at any remote station detector loop end. These Master circuits also include relays with lock up circuits for retaining the indicator light energized until released by manual operation of a restore switch.

The Master circuit shown in FIG. 5 uses a PNP transistor 150, whose base is connected to the one terminal of a resistor 152. The other end of resistor 152 is connected to resistor 72, and resistor 76 through diode 74, so as to form a voltage divider for biasing transistor 150. A 39 volt Zener diode 154 is connected between plus 47 volts and the emitter of transistor 150, and a capacitor 156 is jumpered across the base and emitter of transistor 150. The collector of transistor 150 is connected to the anode of an isolation diode 157. The cathode of isolation diode 157 is wired to the minus side of the power supply through two resistors, resistor 158 and resistor 159, a line marked Common Line and a series of normally closed test points, T1, T2 and Scan Rate. The junction of resistors 158 and 159 is connected to the base of an NPN transistor 160, with the emitter of transistor 160 connected to Common Line. The collector of transistor 160 is connected to plus 20 volt line through a series of resistors 162 and 164. The base of a PNP transistor 170 is connected to the junction of resistors 162 and 164, with the emitter of transistor 170 connected to plus 20 volt line.

A series of parallel circuits consisting of a resistor in series with an indicator, a suppression diode and a relay coil, are wired in parallel across Common Line and the plus 20 volt line, through transistor 170 and multiple N/O relay points serving as holding circuits. Each parallel circuit has the anode of the suppression diode wired to Common Line.

The first of the parallel circuits consists of resistor 172 wired to Common Master trouble indicator 174, suppression diode 180 and relay coil 176. This first circuit has a parallel path to plus 20 volt line. One path is through the collector of transistor 170 and the other is through N/O points 178 made operative when relay coil 176 is energized. The second parallel circuit consists of resistor 182 wired to Common Master environmental or alarm indicator 184, suppression diode 188 and relay coil 186 wired to plus 20 volt line through the N/O relay points 187 made operative when relay coil 186 is energized. The third parallel circuit consists of resistor 192 wired to an Individual Master indicator 194, suppression diode 198 and relay coil 196 wired to plus 20 volts line through the N/O points 197 made operative when relay coil 196 is energized. The fourth parallel circuit consists of resistor 202 wired to an Individual Master indicator 204, suppression diode 208 and relay coil 206 wired to plus 20 volt line through N/O point 207 made operative when relay coil 206 is energized. An isolation diode 210 is wired between the plus 20 volt side of the second and third parallel circuits, with the anode of diode 210 connected to the third parallel circuit. This anode connection may also be wired to the cathode of an isolation diode 106 (see FIG. 4A) of any number of stages of ring counter K. An isolation diode 212 is wired between the plus 20 volt side of the second and fourth parallel circuits, with the anode of diode 212 connected to the fourth parallel circuit and may also be wired to the cathode of an isolation diode 106 (see FIG. 4A) of any number of stages of ring counter K. An isolation diode 214 is connected between Common Line and resistor 26 with the anode connected to resistor 26.

OPERATION OF OPTIONAL FEATURES

The Common Master circuits outlined in the optional features provide for lighting a trouble indicator in event any zone circuit or line wire is open and for lighting an environmental or alarm indicator in the event any zone alarm pilot light is lighted. As was described previously, these Master circuits also include relays with lock-up circuits for retaining the indicator light energized until released by manual operation of a restore switch.

Sensing the trouble condition to cause lighting of the Common Master trouble indicator 174 is accomplished as follows. The end of line resistor 130 at any remote station, in series with resistor 72 and the parallel combination of resistor 76 in the corresponding sensing stage L and resistor 152 in the Common Master circuits, form a voltage divider for biasing transistor 150. Zener diode 154 in the emitter circuit of transistor 150 keeps transistor 150 from conducting until the bias on the base of transistor 150 exceeds the Zener voltage of diode 154, of approximately 39 volts. If the circuit is closed through the end-of-line resistor 130, the bias voltage on the base of transistor 150 will be less than the Zener voltage of 39 volts and therefore, transistor 150 will not conduct. If, however, the circuit through the end-of-line resistor 130 is open for any reason, the base bias voltage on transistor 150 will exceed the 30 volt Zener voltage and transistor 150 will then conduct. When transistor 150 conducts, its collector current through diode 157 and resistors 158 and 159 will bias the base of transistor 160 so that conduction will then take place in transistor 160. With transistor 160 conducting, the collector current of transistor 160 through resistors 162 and 164 will bias the base of transistor 170 so that it will then conduct. With transistor 170 conducting, its collector current will then energize both Common Master trouble indicator 174 and relay coil 176. Energized relay coil 176 will then be locked "on" through its N/O contact points 178 back to the plus 20 volt line.

The Common Master environmental or alarm indicator 184 is activated at any time an individual stage environmental or alarm indicator is activated. As previously explained, whenever any sensing circuit relay coil 86 was activated for an environmental or alarm condition, its normally open points 98 transferred to complete a circuit from plus 20 volt line through resistor 100 and sensing stage environmental or alarm indicator 102 and isolation diode 104 to the minus side of the line. If an indication is sensed in any stage, a second circuit is completed through isolation diode 106 of that stage to the second parallel circuit of the Common Master circuits. This circuit is indicated in FIG. 5 by reference to isolation diodes 210 and 212. When this circuit is completed, relay coil 186 and Common Master environmental or alarm indicator 184 are energized, and N/O points 187 are transferred to provide a hold circuit for relay coil 186.

Diodes 210 and 212 may be connected to an isolation diode 106 of any number of ring counter K stages, but diodes 210 and 212 must be connected to at least one such isolation diode 106 for Common Master environmental or alarm relay coil 186 to be energized for every activation of an alarm circuit. The bus connection to diode 210 through an isolation diode 106 has been labeled Fire Alarm Stages, depending upon which detector loops N have been so designated and connected to such bus. The bus connection to diode 212 through an isolation diode 106 has been labeled Security Alarm Stages, depending upon which detector loops N have been so designated and connected to such bus. These buses need not be limited to only two such designations, but other buses may be provided to indicate additional classes of alarm, i.e., "Supervisory."

Should diode 210 be connected to the ring counter K stage in which the alarm condition has been sensed, the Fire Alarm bus would be activated when the second parallel circuit of the Common Master circuit is energized, as previously indicated. Relay 196 would be now energized, transferring N/O relay points 197, creating a lock up hold circuit for relay 196. Individual Master environmental or alarm indicator 194 would thus be "on." However, should diode 212 also be connected to the sensing ring counter K stage, then relay 206 would also be energized and held locked up through its N/O points 207. Indicator 204 would then also be "on."

Opening of any of the normally closed switch points, T1, T2, or Scan Rate will interrupt the hold circuit for the lockup relays of the Master Circuits and extinguish any indicators that were "on." If the remote station circuits return to normal, the Common and Individual Master indicators will remain extinguished. If, however, a trouble or environmental or alarm condition still exists, the pertinent Master indicators will come "on" again when the switches T1, T2 or Scan Rate are returned to normal. The Individual Master environmental or alarm circuits are provided, as indicated, to permit the identification of the class of alarm, such as "Fire," "Security," "Supervisory" and so forth. Diodes 210 and 212 permit energizing the Common Master environmental circuit if either of the Individual Master environmental circuits is energized. Diode 214 blocks Common Line from feedback to the relaxation oscillator H.

In accordance with the preferred embodiment of the invention, the values and types of various components illustrated in FIGS. 3–5 are found in Table I.

TABLE I

| Component | | Component value or type |
|---|---|---|
| Capacitor | 20 | 1 microfarad. |
| Resistor | 22 | 100 ohms. |
| Signal diode | 24 | 4E30-8. |
| Resistor | 26 | 39 kilohms. |
| Resistor (adj.) | 28 | 250 kilohms—RV21. |
| Capacitor | 30 | 0.0047 microfarad. |
| Signal diode | 32 | 4E50-28. |
| Resistor | 34 | 27 kilohms. |
| Do | 37 | 6.8 kilohms. |
| Capacitor | 38 | 0.01 microfarad. |
| Resistor | 39 | 1500 ohm, 3 watt. |
| Transistor | 40 | 2N4036. |
| Resistor | 42 | 1 kilohm. |
| Do | 44 | 10 kilohm. |
| Do | 46 | 2.2 kilohm, 3 watt. |
| Do | 48 | 1 kilohm, 3 watt. |
| Indicator | 49 | GE6C. |
| Signal diode | 54 | 4E30-8. |
| Resistor | 58 | 820 ohms. |
| Do | 59 | 100 ohms. |
| Transistor | 60 | 2N3417. |
| Capacitor | 68 | 0.01 microfarad. |
| Resistor | 72 | 1 kilohm. |
| Do | 76 | 12 kilohm. |
| Do | 78 | 2.2 kilohm. |
| Transistor | 80 | 2N3417. |
| Signal diode | 84 | 4E30-8. |
| Relay coil | 86 | 2.2 kilohms. |
| Capacitor | 89 | 0.33 microfarad. |
| Resistor | 92 | 270 ohm, 3 watt. |
| Indicator | 96 | 1,867. |
| Resistor | 100 | 270 ohm, 3 watt. |
| Indicator | 102 | 1,867. |
| Relay coil | 114 | 2.2 kilohms. |
| Resistor | 115 | 1 kilohm. |
| Do | 117 | Do. |
| Do | 124 | 100 ohms. |
| End-of-line resistor | 130 | 1.5 kilohms. |
| Zener diode | 140 | 20 volt, 10 watt. |
| Resistor | 142 | 15 ohm, 10 watt. |
| Transistor | 150 | 2N4036. |
| Resistor | 152 | 100 kilohm. |
| Zener diode | 154 | 39 volt, 1 watt. |
| Capacitor | 156 | 0.33 microfarad. |
| Resistor | 158 | 1.5 kilohm. |
| Do | 159 | 270 ohm. |
| Transistor | 160 | 2N3417. |
| Resistor | 162 | 47 ohm. |
| Do | 164 | 1 kilohm. |
| Transistor | 170 | 2N4036. |
| Resistors | 172, 182, 192 and 202 | 250 ohm, 5 watt. |

Although the invention has been shown in connection with a preferred embodiment, it will be readily apparent to those skilled in the art that various changes in form and arrangement of parts may be made to suit requirements without departing from the spirit and scope of the invention as defined by the appended claims.

What is claimed is:

1. A monitoring system for sensing conditions at a plurality of remote stations comprising:

a plurality of remote station energizable monitoring circuits each including an associated actuatable means for, when actuated during a time period that its associated monitoring circuit is energized, generating an environmental signal representative of a particular conditioning occurring at said remote station;

a like plurality of sensing circuits each associated with one of said monitoring circuits and including condition indicating means and environmental circuit means responsive to a said environmental signal from its associated monitoring circuit to energize said condition means, and two sequencer circuit means, one for sequentially energizing each of said monitoring circuits for a given period of time, the second sequencer circuit means for sequentially energizing each of said sensing circuits during a corresponding period of time so that during said given period of time the then energized monitoring circuit is conditioned to transmit a said environmental signal to the corresponding then energized sensing circuit in the event the actuatable means for such environmental signal becomes actuated.

2. A monitoring system as set forth in claim 1, wherein said monitoring sequencer circuit means includes pulse generator means for generating supervisory signals each for a given period of time, said signal generating means having means for transmitting each said supervisory ignal to energize a said monitoring circuit, each said supervisory signal normally having an amplitude of a predetermined value.

3. A monitoring system as set forth in claim 2, wherein said monitoring sequencer circuit means also includes electronic means for sequentially energizing each said monitoring circuit for said given period of time, said pulse generator means having voltage storing means for impulsing said electronic means into conduction.

4. A monitoring system as set forth in claim 3, wherein each supervisory signal has an amplitude equal to said environmental signal amplitude which is greater than said predetermined value when said actuatable means has been actuated, and has a lesser amplitude than said predetermined value because of increased circuit resistance in the event of a trouble condition characterized by a line failure within the system.

5. A monitoring circuit as set forth in claim 4, wherein each said sensing circuit includes a second circuit means for sensing that a normal condition exists at said remote station, said second circuit means being energized by said supervisory signal of said predetermined value.

6. A monitoring circuit as set forth in claim 5, wherein each said sensing circuit includes a third circuit means for signifying that a line failure has occurred within said system, said third circuit means including a second condition indicating means being energized by said supervisory signal of said lesser amplitude.

7. A monitoring circuit as set forth in claim 6, wherein said condition indicating means includes an alarm indicator and said second indicating means includes a trouble indicator.

8. A monitoring circuit as set forth in claim 3, wherein said electronic means includes:
a ring counter having a like plurality of counter stages for sequentially energizing each of said monitoring circuits for said period of time in conjunction with said supervisory signals;
said storing means providing drive pulses for also stepping said ring counter; and
means for periodically actuating said pulse generator means.

9. A monitoring circuit as set forth in claim 8, wherein each said actuatable means includes a remote station detector loop having a resistor connected in parallel across at least one actuatable pair of contacts.

10. A monitoring circuit as set forth in claim 8, wherein said sequencer circuit means includes a control circuit means for synchronizing the energization of said energizable monitoring circuits and said ring counter, said control circuit means including a monitoring indicator and a switch means.

11. A monitoring circuit as set forth in claim 10, wherein said switch means includes a semiconductor, each said supervisory signal has an amplitude equal to said environmental signal amplitude which is greater than said predetermined value when said actuatable means has been actuated, and has a lesser amplitude than said predetermined value because of increased circuit resistance in the event of a trouble condition characterized by a line failure within the system.

12. A monitoring system as set forth in claim 11, wherein each said sensing circuit includes a second circuit means for sensing that a normal condition exists at said remote station, said second circuit means being energized by said supervisory signal of said predetermined value.

13. A monitoring system as set forth in claim 12, wherein each said sensing circuit means includes a third circuit means for signifying that a line failure has occurred within said system, said third circuit means including a second condition indicating means being energized by said supervisory signal of said lesser amplitude.

14. A monitoring system as set forth in claim 13, wherein said condition indicating means includes an alarm indicator and said secondary indicating means includes a trouble indicator.

15. A monitoring system for sensing conditions at a plurality of remote stations comprising
a plurality of remote station energizable monitoring circuits each including an associated actuatable means for, when actuated during a time period that its associated monitoring circuit is energized, generating an environmental signal representative of a particular condition occurring at said remote station;
a like plurality of sensing circuits each associated with one of said monitoring circuits and including condition indicating means and environmental circuit means responsive to a said environmental signal from its associated monitoring circuit to energize said condition indicating means, said condition indicating means including an alarm indicator, and
sequencer circuit means for sequentially energizing each of said monitoring circuits for a given period of time so that during said given period of time the then energized monitoring circuit is conditioned to transmit a said environmental signal in the event its actuatable means becomes actuated;
said sequence circuit means including pulse generator means for generating supervisory signals each for a given period of time, said signal generating means having means for transmitting each said supervisory signal to energize a said monitoring circuit, each said supervisory signal normally having an amplitude of a predetermined value;
said sequencer circuit means also including electronic means for sequentially energizing each said monitoring circuit for said given period of time, said pulse generator means having voltage storing means for impulsing said electronic means into conduction
said electronic means including:
a ring counter having a like plurality of counter stages for sequentially energizing each of said monitoring cricuits for said period of time in conjunction with said supervisory signals; and
means for periodically actuating said pulse generator means;
said voltage storing means providing drive pulses for also stepping said ring counter
said sequencer circuit means also including a control circuit means for synchronizing the energization of said energizable monitoring circuits and said ring counter, said control circuit means also including a monitoring indicator and a switch means;
said switch means including a semiconductor, each said supervisory signal having an amplitude equal to said environmental signal amplitude which is greater than said predetermined value when said actuatable means has been actuated, and having a lesser amplitude than said predetermined value because increased circuit resistance in the event of a trouble condition characterized by a line failure within the system;
each said sensing circuit including a second circuit means for sensing that a normal condition exists at said remote station and a third circuit means, said second circuit means being energized by said supervisory signal of said predetermined value, said third circuit means serving for signifying that a line failure has occurred within the system and including a second condition indicating means including a trouble indicator and being energized by said supervisory signal of said lesser amplitude, said switch means including a first transistor;

said sequence circuit means including a first switching diode and a first voltage storage means causing conduction in said first switching diode when said first stored voltage reaches a predetermined value;

said pulse generator means including a second switching diode and a second voltage storage means for causing conduction in said second switching diode when said second stored voltage reaches a like predetermined value, said pulse generator means also including means for connecting said second switching diode to said first stage of said ring counter;

each said energizable monitoring circuit including a plurality of isolation diodes connected to a first relay coil with means connecting each said energizable monitoring circuit to a succeeding energizable monitoring circuit;

each said second circuit means including a resistor divider network and a second transistor having the base of said second transistor connected to the junction of said resistor divider network;

each said environmental circuit means including a first isolation diode and a resistor in series therewith connected to the collector of said second transistor;

each said third circuit means including a third switching diode connected to a first parallel circuit having a second relay coil and a second isolation diode connected to the base of said second transistor; and each said stage of said ring counter including a fourth switching diode connected to a second parallel circuit having a third voltage storage means and a third isolation diode, a third transistor, said third isolation diode being connected to one end of a second resistor divider network whose junction is connected to the base of said third transistor, said third transistor having a collector connected to a said sensing circuit and having an emitter connected to the opposite end of said second resistor divider network.

16. A monitoring system as set forth in claim 15 wherein said first transistor is a PNP transistor, and said second and third transistors are NPN transistors.

17. A monitoring system as set forth in claim 16 wherein each said actuatable means includes a remote station detector loop having a resistor connected in parallel across at least one actuatable pair of contacts.

18. A monitoring system for sensing conditions at a plurality of remote stations comprising:

a plurality of remote station energizable monitoring circuits each including an associated actuatable means for, when actuated during a time period that its associated monitoring circuit is energized, generating an environmental signal representative of a particular condition occurring at said remote station;

a like plurality of sensing circuits each associated with one of said monitoring circuits and including condition indicating means and environmental circuit means responsive to a said environmental signal from its associated monitoring circuit to energize said condition indicating means, and sequencer circuit means for sequentially energizing each of said monitoring circuits for a given period of time so that during said given period of time the then energized monitoring circuit is conditioned to transmit a said environmental signal in the event its actuatable means becomes actuated, the sequencer circuit means comprising a pulse generator and a plurality of ring connected stages with an input coupling from the pulse generator to each of said stages and couplings between successive stages, each stage comprising an electronic discharge means in series with resistor means, the coupling between stages being connected from the junction of the electronic discharge means of the successive stage.

19. A monitoring system as in claim 18, wherein the pulse generator comprises a capacitor and a resistor in series, a 4-layer Shockley switching diode in parallel with said capacitor resistor series unit and an output coupling.

20. A monitoring system as set forth in claim 19, wherein each ring connected stage comprises a 4-layer Shockley switching diode, a semiconductor diode and a resistor connected in series to the output coupling from the pulse generator, the coupling between stages being connected between the junction of the semi-conductor diode and resistor in one stage and the junction of the 4-layer diode and seimconductor diode of the succeeding stage.

References Cited

UNITED STATES PATENTS

| | | | |
|---|---|---|---|
| 3,099,824 | 7/1963 | Vitt et al. | 340—214 |
| 3,402,404 | 9/1968 | Burley et al. | 340—176 |
| 3,478,352 | 11/1969 | Eisenberg | 340—409 |

DONALD J. YUSKO, Primary Examiner

U.S. Cl. X.R.

340—147